(12) United States Patent
Yoon et al.

(10) Patent No.: US 9,082,016 B2
(45) Date of Patent: Jul. 14, 2015

(54) MOBILE APPARATUS AND METHOD FOR CONTROLLING THE SAME

(71) Applicant: SAMSUNG ELECTRONICS CO., LTD., Suwon-si, Gyeonggi-do (KR)

(72) Inventors: Suk June Yoon, Seoul (KR); Kyung Shik Roh, Seongnam-si (KR); Sang Il Hong, Suwon-si (KR); Seung Yong Hyung, Yongin-si (KR); Hyo Seok Hwang, Seoul (KR); Sung Hwan Ahn, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 196 days.

(21) Appl. No.: 13/645,860

(22) Filed: Oct. 5, 2012

(65) Prior Publication Data

US 2013/0089235 A1 Apr. 11, 2013

(30) Foreign Application Priority Data

Oct. 6, 2011 (KR) .................. 10-2011-0101714

(51) Int. Cl.
*G06K 9/00* (2006.01)
*G06K 9/46* (2006.01)

(52) U.S. Cl.
CPC .......... *G06K 9/00664* (2013.01); *G06K 9/4671* (2013.01)

(58) Field of Classification Search
None
See application file for complete search history.

(56) References Cited

U.S. PATENT DOCUMENTS

| | | | | |
|---|---|---|---|---|
| 7,693,301 B2 * | 4/2010 | Li et al. | | 382/103 |
| 8,068,639 B2 * | 11/2011 | Ishiwata et al. | | 382/103 |
| 8,515,131 B2 * | 8/2013 | Koch et al. | | 382/103 |
| 2004/0057634 A1 * | 3/2004 | Mutoh | | 382/298 |
| 2005/0238198 A1 * | 10/2005 | Brown et al. | | 382/103 |
| 2010/0128927 A1 * | 5/2010 | Ikenoue | | 382/103 |
| 2010/0172542 A1 * | 7/2010 | Stein et al. | | 382/103 |

(Continued)

FOREIGN PATENT DOCUMENTS

| | | | |
|---|---|---|---|
| JP | 2010-218022 | | 9/2010 |
| JP | 2010218022 A | * | 9/2010 |
| KR | 10-2005-0007504 | | 1/2005 |
| KR | 10-2010-0035108 | | 4/2010 |

OTHER PUBLICATIONS

Bretzner et al ("Feature Tracking with Automatic Selection of Spacial Scales", 1998).*

(Continued)

*Primary Examiner* — Avinash J Yentrapati
(74) *Attorney, Agent, or Firm* — Harness, Dickey & Pierce, P.L.C.

(57) ABSTRACT

A method of controlling a mobile apparatus includes acquiring a first original image and a second original image, extracting a first feature point of the first original image and a second feature point of the second original image, generating a first blurring image and a second blurring image by blurring the first original image and the second original image, respectively, calculating a similarity between at least two images of the first original image, the second original image, the first blurring image, and the second blurring image, determining a change in scale of the second original image based on the calculated similarity, and controlling at least one of an object recognition and a position recognition by matching the second feature point of the second original image to the first feature point of the first original image based on the change in scale.

21 Claims, 12 Drawing Sheets

(56) References Cited

U.S. PATENT DOCUMENTS

| | | | |
|---|---|---|---|
| 2012/0050334 A1* | 3/2012 | Velthoven et al. | 345/660 |
| 2012/0121130 A1* | 5/2012 | Kaminka et al. | 382/103 |
| 2013/0215264 A1* | 8/2013 | Soatto et al. | 348/143 |
| 2013/0273968 A1* | 10/2013 | Rhoads et al. | 455/556.1 |
| 2013/0295894 A1* | 11/2013 | Rhoads et al. | 455/414.1 |
| 2014/0080428 A1* | 3/2014 | Rhoads et al. | 455/88 |

OTHER PUBLICATIONS

"Gaussian Filtering", The University of Auckland 2010.*

Extended European Search Report issued Sep. 8, 2014 in corresponding European Patent Application No. 12187475.4.

Zhi Yuan et al: "Super resolution based on scale invariant feature transform", IEEE Jul. 7, 2008, pp. 1550-1554.

Frederique Crete et al: "The blur effect: perception and estimation with a new no-reference perceptual blur metric", Jan. 1, 2007, vol. 6492, pp. 64920I-1-64920I-11.

Richard Hartley et al: "Passage 2.4 (A hierarchy of transformations)", Multiple View Geometry in Computer Vision, Jan. 1, 2003, pp. 36-45.

H. Hu et al: "Low cost robust blur estimator", IEEE Oct. 1, 2006, pp. 617-620.

L. Bretzner et al: "Feature Tracking with Automatic Selection of Spatial Scales", Sep. 1, 1998, vol. 71 No. 3, pp. 385-392.

* cited by examiner

Image gradients → Keypoint descriptor

I(t-1)

NORMAL > BLURRING

I(t)

B(t-1)

B(t)

I(t-1)

GETTING CLOSER TO OBJECT →

I(t)

B(t-1)

B(t)

I(t-1)

I(t)

BLURRING > NORMAL

B(t-1)

B(t)

I(t-1)

GETTING DISTANT
AWAY FROM OBJECT →

I(t)

B(t-1)

B(t)

I(t-1)

NORMAL -> NORMAL

I(t)

B(t-1)

B(t)

MOBILE APPARATUS AND METHOD FOR CONTROLLING THE SAME

CROSS-REFERENCE TO RELATED APPLICATIONS

This application claims the benefit of Korean Patent Application No. 2011-0101714, filed on Oct. 6, 2011 in the Korean Intellectual Property Office, the disclosure of which is incorporated herein by reference.

BACKGROUND

1. Field

One or more embodiments relate to a mobile apparatus for recognizing at least one of an object and a position by extracting a feature point and using the extracted feature point and a method for controlling the same.

2. Description of the Related Art

Object recognition represents a technology of viewing an image of an object and obtaining three-dimensional spatial information of the type, the size, the direction, and the position of the object based on previously acquired knowledge.

Localization (position recognition) represents a technology of providing a space perception while being regarded as a key technology in implementing an autonomous mobile function. In recent years, various approaches for localization have been presented including a sensor-based localization, a mark-based localization, and a stereo vision-based localization.

Object recognition and localization may be implemented, for example, on a mobile terminal which performs fingerprint recognition, face recognition and augmented reality, an intelligent vehicle which performs a Smart Cruise Control, an Adaptive Cruise Control (ACC) and a collision avoidance function, and a robot which conducts tasks related to production and services.

In the early stage of robot technology, a robot was used at a work site to perform a simple and repetitive job at a fixed position. However, as robot technology has developed, the robot has been implemented in various forms such that more various jobs are achieved with a high intelligence.

That is, nowadays, the robot may be equipped with an autonomous motion capability to autonomously perform various tasks.

To this end, the robot may be given a localization function capable of determining its current position by remembering its initial position and using information on changed position and previous position information.

However, a conventional localization has difficulty in obtaining a displacement caused by an external force applied to a robot and thus fails to recognize the position after the application of the external force.

In order to compensate for such a constraint, a robot may obtain more detailed information on the surrounding environment by use of, for example, a range sensor, such as a laser sensor and an ultrasonic sensor in performing the localization.

That is, the robot performs the localization together with the object recognition.

However, the change in pose and lighting may cause difficulty in retrieving an object image about an object identical to a query image or an object image having a high similarity to the query image in the database that is previously stored for an object recognition.

In addition, if only a few query images are provided, the object recognition performance may be significantly lowered.

In addition, such an object recognition using only a few query images may not suitable for recognizing a moving object image, and in particular, may exhibit a poor recognition result for different-sized sized images.

A flux-concentrated motor is configured to increase a torque generated per a volume by concentrating a magnetic flux and includes a stator and a rotor. The rotor includes rotor cores, which are disposed at an inner side or an outer side of the stator in a circumferential direction of the rotor while being separated from each other to rotate with electromagnetic interaction, and a permanent magnet (hereinafter, referred to as a 'magnet') coupled to an area between the rotor cores.

There are at least two ways to assemble a magnet to a rotor core, for example. A first way is referred to a pre-magnetization in which a magnet is magnetized first, and then the magnetized magnet is assembled to an area between rotor cores. A second way is referred to a post-magnetization in which an unmagnetized magnet is assembled to an area between rotor cores and then is subject to magnetization. The pre-magnetization is easy to achieve magnetization. However, the pre-magnetization has a difficulty in assembly due to attractive force and repulsive force between magnets, and may damage nearby equipment. Accordingly, the use of the post-magnetization is increasing.

Meanwhile, the post-magnetization has an advantage of easily assembling a magnet. However, according to the post-magnetization, a magnet needs to be magnetized while being assembled between rotor cores, having a difficulty in equally magnetizing the magnet. Accordingly, there is a need for a structure of a rotor enabling a magnet to be equally magnetized and a magnetizing apparatus thereof.

SUMMARY

Therefore, the foregoing described problems may be overcome and/or other aspects may be achieved by one or more embodiments of a mobile apparatus and a control method thereof, capable of extracting a feature point by predicting the change in scale according to the occurrence of blurring and according to the change in a position for obtaining an image.

In addition, the foregoing described problems may be overcome and/or other aspects may be achieved by one or more embodiments of a mobile apparatus and a control method thereof, capable of predicting the change in scale by calculating a similarity among a previous original image, a current original image, a previous blurring image, and a current burring image by use of a correlation coefficient of a line that is sampled from a previous image and a current image.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, a method of controlling a mobile apparatus may be as follows. A first original image may be acquired and then a second original image may be acquired. A first feature point of the first original image may be extracted and a second feature pint of the second original image may be extracted. A first blurring image and a second blurring image may be generated by blurring the first original image and the second original image, respectively. A similarity between at least two images of the first original image, the second original image, the first blurring image and the second blurring image may be calculated. A change in scale of the second original image may be determined based on the calculated similarity. At least one of an object recognition and a position recognition may be controlled by matching the second feature point of the second original image to the first feature point of the first original image based on the change in scale.

The extracting of the first feature point from the first original image may include dividing the first original image into grids having a predetermined size, and extracting a predetermined number of first feature points from each grid.

The extracting of the first feature point from the first original image may be performed by use of a Features from Accelerated Segment Test (FAST) corner detector.

The extracting of the second feature point from the second original image may include extracting a larger number of second feature points than the first feature points by use of a threshold value smaller than a threshold value of a FAST corner of the first original image.

The determining of the change in scale of the second original image based on the calculated similarity may be as follows. First, a similarity corresponding to a correlation coefficient between the first original image and the first blurring image may be compared with a similarity corresponding to a correlation coefficient between the second original image and the second blurring image. If a difference between the similarities exceeds a predetermine value, it may be determined that the second original image has changed in scale. A scale in change of the second original image may be predicted. A second feature point of the second original image corresponding to the predicated scale of the second original image may be checked.

The calculating of the similarity of the at least two images among the first original image, the second original image, the first blurring image, and the second blurring image may include calculating a first similarity corresponding to a correlation coefficient among the first original image, the first blurring image, the second original image and the second blurring image, calculating a second similarity corresponding to a correlation coefficient between the first original image and the second blurring image, and calculating a third similarity corresponding to a correlation coefficient between the first blurring image and the second original image.

The predicting of the scale of the second original image may be as follows. A first image patch having the first feature point and second image patches of multi-scale each having the second feature point may be generated. The scale of the second image patch may be predicted in a normal search range if the first similarity is largest among the first similarity, the second similarity, and the third similarity. The second similarity may be compared with the third similarity if the first similarity is equal to or smaller than at least one of the second similarity and the third similarity. The scale of the second image patch may be predicted in a scale-up search range if the second similarity is larger than the third similarity. The scale of the second image patch may be predicted in a scale-down search range if the second similarity is equal to or smaller than the third similarity.

The matching of the first feature point to the second feature point may be performed as follows. A first descriptor corresponding to the first image patch and second descriptors of multi-scale each corresponding to the second image patch may be generated. The first descriptor of the first image patch may be matched to the second descriptor of the second image patch in the predicted scale-search range.

The generating of the first descriptor and the second descriptor may be performed by use of Speeded Up Robust Feature (SURF).

The predicting of the scale of the second image patch based on the calculated similarity may be as follows. A feature vector of each of the second descriptors of the second image patches in the predicted scale-search range may be compared with a feature vector of the first descriptor of the first image patch to calculate a distance between the feature vectors. A second descriptor having a feature vector that is nearest to the feature vector of the first descriptor may be checked among the second descriptors. A scale having the checked second descriptor may be predicted as the scale of the second image patch.

The generating of the first image patch having the first feature point of the first original image and the second image patch having the second feature point of the second original image may be as follows. A plurality of first feature points and a plurality of second feature points may be extracted. A plurality of first image patches, each corresponding to each of the first feature points, may be generated. A plurality of second image patches, each corresponding to each of the second feature points, may be generated. A plurality of first descriptors each corresponding to each of the first image patches and a plurality of second descriptors each corresponding to each of the second image patches may be generated. The matching of the first descriptor of the first image patch to the second descriptor of the second image patch in the predicted scale-search range may be as follows. A feature vector of each of the plurality of first descriptors may be compared with a feature vector of each of a plurality of second descriptors in the predicted scale range. A first feature point may be matched to a second feature point of a second descriptor in the predicted scale, in which a first descriptor of the matched first feature point may have a feature vector nearest to a feature vector of the second descriptor of the matched second feature point.

The method may further include the following. A scale of a second image patch that is first generated among the second image patches may be set as a reference scale. A plurality of second image patches each having a different scale that is increased or decreased based on the reference scale may be arranged according to scales. A predetermined range based on the reference scale may be set to a normal-search range. A range equal to or lower than the predetermined range may be set to a scaled-down search range. A range higher than the predetermined range may be set to a scale up-search range. The set ranges may be stored.

The calculating of the first similarity, the second similarity and the third similarity may be performed as follows. At least one line may be generated on the first original image, the second original image, the first blurring image, and the second blurring image. A correlation coefficient between at least two images among the first original image, the second original image, the first blurring image, and the second blurring image may be calculated by sampling the at least one line. The first similarity, the second similarity, and the third similarity may be calculated based on the calculated correlation coefficient between the at least two images.

The extracting of the second feature point from the second original image may be as follows. A window of a predetermined range that may be generated based on a position of the first feature point may be set. A second feature point may be extracted from the set window.

In accordance with another aspect of the present disclosure, a mobile apparatus may include, for example, an image acquirer, a feature point extractor, a blurring image generator, a scale predictor, a matcher and a recognizer. The image acquirer may be configured to acquire a first original image and a second image of an object. The feature point extractor may be configured to extract a first feature point of the first original image, extract a second feature point of the second original image and generate a first image patch having the first feature point and second image patches of multi-scale each having the second feature point. The blurring image generator may be configured to generate a first blurring image, which may be obtained by blurring the first original image, and a second blurring image, which may be obtained by blurring the second original image. The scale predictor may be configured to predict a scale of the second image patch by calculating a similarity between at least two images of the first original image, the second original image, the first blurring image, and the second blurring image. The matcher may be configured to match a second feature point included in a second image patch in the predicted scale to the first feature point included in the first image patch. The recognizer may be configured to perform at least one of an object recognition and a position recognition based on the matching.

The mobile apparatus may further include a descriptor generator that may be configured to generate a first descriptor for the first image patch and second descriptors of multi-scale for the second image patches.

The descriptor generator may generate descriptors of at least one scale by use of Speeded Up Robust Feature (SURF).

The feature point extractor may generate a predetermined size of grids from the first original image and extract a predetermined number of first feature points from each grid.

The scale predictor may generate at least one line on an identical position in the first original image, the second original image, the first blurring image, and the second blurring image, sample the at least one line, and calculate a correlated coefficient from the sampled at least one line.

The feature point extractor may extract the first and second feature points by use of Features from Accelerated Segment Test (FAST) corner detector.

The scale predictor may be configured to calculate a first similarity corresponding to a correlation coefficient between the first original image, the first blurring image, the second original image, and the second blurring image, to calculate a second similarity corresponding to a correlation coefficient between the first original image and the second blurring image, and to calculate a third similarity corresponding to a correlation coefficient between the first blurring image and the second original image. The scale predictor may be configured to set, as a reference scale, a scale of a second image patch that may be first generated based on the second original image among the second image patches of multi-scale, to predict a scale of a second image patch in a predetermined range based on the reference scale if the first similarity is largest among the first similarity, the second similarity and the third similarity, to predict the scale of the second image patch in a range equal to or higher than the predetermined range if the first similarity is equal to or smaller than at least one of the second similarity and the second similarity and the second similarity is larger than the third similarity, and to predict the scale of the second image patch in a range lower than the predetermined range if the first similarity is equal to or smaller than at least one of the second similarity and the third similarity and the second similarity is equal to or smaller than the third similarity.

According to the mobile apparatus of one or more embodiments and one or more methods of controlling the same, even if a blurring occurs due to the scale change caused by a change in a photographing position and by external force when an image is obtained, the object recognition and the position recognition may be improved. Accordingly, the mobile apparatus and the method thereof may be applicable to a real time system.

In addition, according to the mobile apparatus of one or more embodiments and one or more methods of controlling the same, Features from Accelerated Segment Test (FAST) corner detector may be used in extracting feature points and Speeded Up Robust Features (SURF) may be used in generating descriptors, thereby possibly reducing the time taken for extracting feature points and generating descriptors and thus possibly accelerating the object recognition and the position recognition.

The mobile apparatus of one or more embodiments and one or more methods of controlling the same may be applicable to a user interface of Information Technology (IT) devices, such as game consoles and mobile phones.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
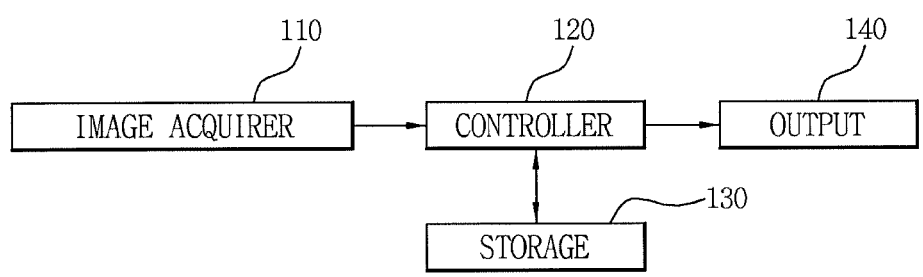
FIG. 1 is a view illustrating the configuration of a mobile apparatus according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 is a view illustrating the configuration of a mobile apparatus according to one or more embodiments. Referring to FIG. 1, a mobile apparatus includes an image acquirer 110, a controller 120, a storage 130, and an output 140.

The mobile apparatus may include an autonomous navigation apparatus that performs an autonomous navigation and a terminal apparatus that may be carried or moved by a user.

The image acquirer 110 may acquire an image about a shape or an object in a space and transmit the acquired image to the controller 120 in real time to perform object recognition and position recognition.

The image acquirer 110 may be configured to acquire an image of an object. According to the image acquirer 110, light may be collected by a light collector (not shown), the collected light may be detected by a photographer which may include an image sensor (not shown), for example, a charge coupled device (CCD) and a complementary metal oxide semiconductor (CMOS), the detected light may be converted to an electrical signal and the converted electrical signal, which may be represented as two dimensional image information, may be transmitted.

The image acquirer 110 may acquire an image of a shape or an object in a space in real time. The image acquired through the image acquirer 110 may include a current original image acquired at a present time and a previous original image acquired at a previous time prior to the present time.

That is, a previous original image right before the current original image among previous original images may be referred to as a first original image I(t−1) and the current original image may be referred to as a second original image I(t).

The controller 120 may sequentially receive the first original image I(t−1) and the second original image I(t); extract first feature points and second feature points from the first original image I(t−1) and the second original image I(t), respectively, generate first image patches of multi-scale each having the first feature point and second image patches of multi-scale each having the second feature point, and generate a first descriptor for the first image patch of multi-scale and a second descriptor for the second image patch of multi-scale.

The first image patch may represent an image having a predetermined size from the first feature point in an area corresponding to the first feature point, and the second image patch may represent an image having a predetermined size from the second feature point in an area corresponding to the second feature point.

The controller 120 may generate first burring image B(t−1), and a second blurring image B(t) by blurring the first original image I(t−1) and the second original image I(t), respectively. The controller 120 may calculate the similarity between at least two images among the first original image I(t−1), the second original image I(t), the first burring image B(t−1), and the second blurring image B(t). The controller 120 may predict a scale of the second image patch having the second feature point based on the calculated similarity. The controller 120 may match the second feature point included in the second image patch in the predicted scale to the first feature point included in the first image patch, thereby possibly controlling at least one of object recognition and position recognition.

The controller 120 may set a scale of a first image patch, which may be generated prior to other first image patch, and a scale of a second image patch, which may be generated prior to other second image patches, as a first reference scale and a second reference scale. The controller 120 may generate first image patches having different sizes increased or decreased from the first reference scale by a predetermined level; that is, the controller 120 may generate first image patches of multi-scale. In addition, the controller 120 may generate second image patches having different sizes increased or decreased from the second reference scale by a predetermined level; that is, the controller 120 may generate second image patches of multi-scale.

The controller 120 may arrange the second image patches according to scales. The controller 120 may set a predetermined range based on the second reference scale to a normal-search range, set a range equal to or lower than the predetermined range to a scale down-search range, and set a range higher than the predetermined range to a scale up-search range. The controller 120 may predict a scale-search range of the second image patch based on the similarity and control matching between the first feature point of the first image patch and the second feature point of the second image patch in the predicated scale.

In this case, the first image patch used in matching may be the first image patch having the first reference scale.

The storage 130 may store the scale of the first image patch, which may be first generated, and the scale of the second image patch, which may be first generated, as the first reference scale and the second reference scale, respectively. The storage 130 may store the first image patches of multi-scale and the second image patches of multi-scale. In addition, the storage 130 may store a predetermined range based on the second reference scale as the normal-search range, store a range equal to or lower than the predetermined range to the scale down-search range, and may store a range higher than the predetermined range to the scale up-search range.

The output 140 may be, for example, at least one of a display, a speaker, and a joint of limb of a robot, such as a joint of a hand or a joint of a leg, etc.

The output 140 may output a result of object recognition through, for example, a display or a speaker to provide a user with information, or may control, for example, joints of a hand of a robot after object recognition to perform a grasp.

In addition, the output 140 may control, for example, the joints of a leg of a robot according to a position recognition based on object recognition to perform movement.

Hereinafter, the controller 120 will be described with reference to FIG. 2 in detail.

Figure 2:
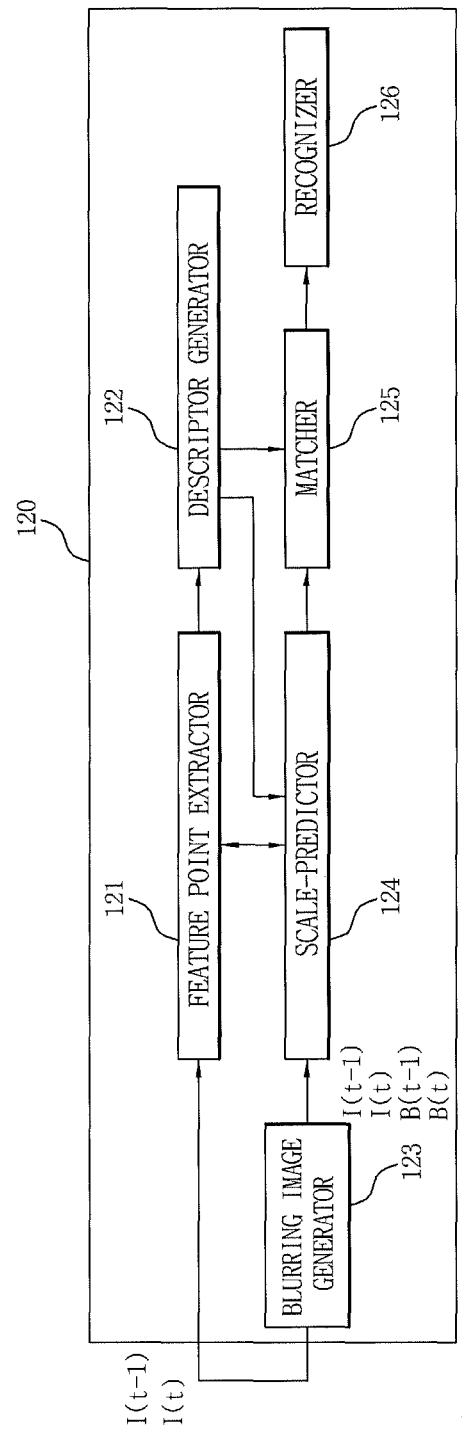
FIG. 2 is a view illustrating the configuration of a controller of the mobile apparatus according to one or more embodiments.

FIG. 2 is a detailed view illustrating the configuration of the controller 120. The controller 120 includes a feature point extractor 121, a descriptor generator 122, a blurring image generator 123, a scale predictor 124, a matcher 125, and a recognizer 126.

The feature point extractor 121 may divide the first original image into grids having a predetermined size, extract a predetermined number of feature points in the divided grid, set a window having a predetermined area in the second original image to correspond to the first feature point, and extract the second feature point from the set window.

The feature point extractor 121 may extract the first feature point and the second feature point by use of Features from Accelerated Segment Test (FAST) corner detector.

The feature point extractor 121 may extract more second feature points than first feature points.

In detail, the feature point extractor 121 may extract the second feature points from the second original image by use of a FAST corner threshold value smaller than that used in extracting the first feature points from the first original image, so that the more second feature points are extracted than the first feature points.

The FAST Corner Detector is an algorithm used to extract a corner point included in an image as a feature point.

For example, the FAST Corner Detector may extract an isolated point of local intensity maximum or minimum, or curved line endings of an image as a feature point. In addition, the FAST Corner Detector may extract an intersection between two edges in an image as a feature point.

The FAST Corner Detector is described at a thesis published by Edward Rosten and Tom Drummond, "Machine learning for high-speed corner detection, Department of Engineering, Cambridge University, UK".

In more detail, according to the FAST Corner Detector, when 16 pixels around a predetermined point form a circle having a value of 3, a feature point may be extracted by comparing the brightness of the pixel and a threshold brightness value. For example, if 12 or more adjacent pixels are brighter or darker than the predetermined point, the predetermined point may be extracted as a feature point.

The FAST Corner Detector only takes about 2 ms in extracting feature points in a two dimension image having a size of 640*480, providing high extraction speed.

In addition, the feature point extractor 121 may be implemented by a Scale Invariant Feature Transform (SIFT), which uses the distribution of brightness variation around a predetermined point in an image, and Speeded Up Robust Features (SURF).

The feature point extractor 121 may generate a first image patch corresponding to a first feature point region image having the first feature point as a center, and a second image patch corresponding to a second feature point region image having the second feature point as a center.

Alternatively, the first image patch and the second patch may be generated by the descriptor generator 122.

The descriptor generator 122 may set a scale of a first image patch corresponding to a first feature point region image, which may be first generated from the first original image, as the first reference scale. In addition, the descriptor generator 122 may generate first image patches of multi-scale, that is, first image patches having different scales by increasing or decreasing the first image patch having the first reference scale.

Similarly, the descriptor generator 122 may generate second image patches of multi-scale.

The descriptor generator 122 may generate a first descriptor for each of the first image patches of multi-scale. In addition, the descriptor generator 122 may generate a second descriptor for each of the second image patches of multi-scale.

Each of the first and second descriptors may include a feature vector having a bin and a size.

In matching between the first feature point and the second feature point, only a first image patch of a reference scale may be used as a first image patch for the matching. Accordingly, a process of generating first image patches of multi-scale and a process of generating a first descriptor for each multi-scale may be omitted.

In this case, a plurality of first feature points and a plurality of second feature points may be provided. Accordingly, first image patches of multi-scale may be generated for each of a plurality of first feature points, and second image patches of multi-scale may be generated for each of a plurality of second feature points. A first descriptor may be generated for each of the first image patches of multi-scale. A second descriptor may be generated for each of the second image patches of multi-scale.

For example, if a plurality of first feature points includes a 1-1 feature point, a 1-2 feature point and a 1-3 feature point, and a plurality of second feature points include a 2-1 feature point, a 2-2 feature point and a 2-3 feature point, the descriptor generator 122 may generate a 1-1 image patch having the 1-1 feature point, a 1-2 image patch having the 1-2 feature point and a 1-3 image patch having the 1-3 feature point and may generate a 2-1 image patch having the 2-1 feature point, a 2-2 image patch having the 2-2 feature point, and a 2-3 image patch having the 2-3 feature point.

The descriptor generator 122 may generate a 1-1 descriptor, a 1-2 descriptor, a 1-3 descriptor, a 2-1 descriptor, a 2-2 descriptor and a 2-3 descriptor for the 1-1 image patch, the 1-2 image patch, the 1-3 image patch, the 2-1 image patch, the 2-2 image patch, and the 2-3 image patch, respectively.

The descriptor generator 122 may generate the first and second descriptors for the first and second image patches of multi-scale by use of Speeded Up Robust Features (SURF).

The SURF is an algorithm that is suggested by Herbert Bay in 2006 and provided to improve the operation speed by reducing the dimensionality of a descriptor.

The SURF algorithm provides a robustness exceeding a simple Gradient by adopting Harr Wavelet.

The blurring image generator 123 may generate the first blurring image B(t−1) and the second blurring image B(t) by blurring the first original image I(t−1) and the second original image I(t), respectively.

The scale predictor 124 may calculate a first similarity based on a correlation coefficient between the first original image I(t−1), the second original image I(t), the first blurring image B(t−1), and the second blurring image B(t); calculate a second similarity based on a correlation coefficient between the first original image I(t−1) and the second blurring image B(t); and calculate a third similarity based on a correlation coefficient between the first blurring image B(t−1) and the second original image I(t).

The correlation coefficient may be implemented using a cross-correlation coefficient.

The scale predictor 124 may predict the scale of the second image patch in a normal search range if the first similarity is largest among the first similarity, the second similarity and the third similarity; compare the second similarity with the third similarity if the first similarity is equal to or smaller than at least one of the second similarity and the third similarity; predict the scale of the second image patch in a scale-up search range if the second similarity is larger than the third similarity; and predict the scale of the second image patch in a scale-down search range if the second similarity is equal to or smaller than the third similarity.

In addition, the scale predictor 124 may compare a feature vector of a first descriptor having a first reference scale, which may be associated with a predetermined first feature point, with feature vectors of second descriptors of second image patches for each scale included in the predicted scale range. Then, the scale predictor 124 may predict a scale including a second descriptor, which may have a feature vector that may be nearest to the feature vector of the first descriptor, among the second descriptors as the scale of the second image patch.

The matcher 125 may compare each of a plurality of first feature points with each of a plurality of second feature points, and may find and match a first feature point that is similar or identical to a second feature point among a plurality of second feature points.

That is, the matcher 125 may search for a first descriptor of a first image patch which is the most identical to a second descriptor of a second image patch in the predicted scale-search range, and may match a first feature point having the found first descriptor to a second feature point having the corresponding second descriptor.

In addition, if the predicted scale-search range includes a plurality of scales, the first descriptor of the first image patch may be compared with each of second descriptors of second image patches of a plurality of scales.

That is, the matcher 125 may calculate the distance between the feature vector of each first descriptor of a plurality of first feature points and a feature vector of a second descriptor of a second image patch of each scale within the predicted scale-search range. Then, the matcher 125 may find and check a first descriptor having a feature vector which is nearest to a feature vector of a second descriptor. Sequentially, the matcher 125 may match a second feature point having the second descriptor to a first feature point having the checked first descriptor.

The calculating of the distance between feature vectors may represent calculating a distance between vectors for each bin.

The recognizer 126 may recognize an object based on a result of matching of the matcher 126, or may recognize its current position based on the recognized object.

Figure 3:
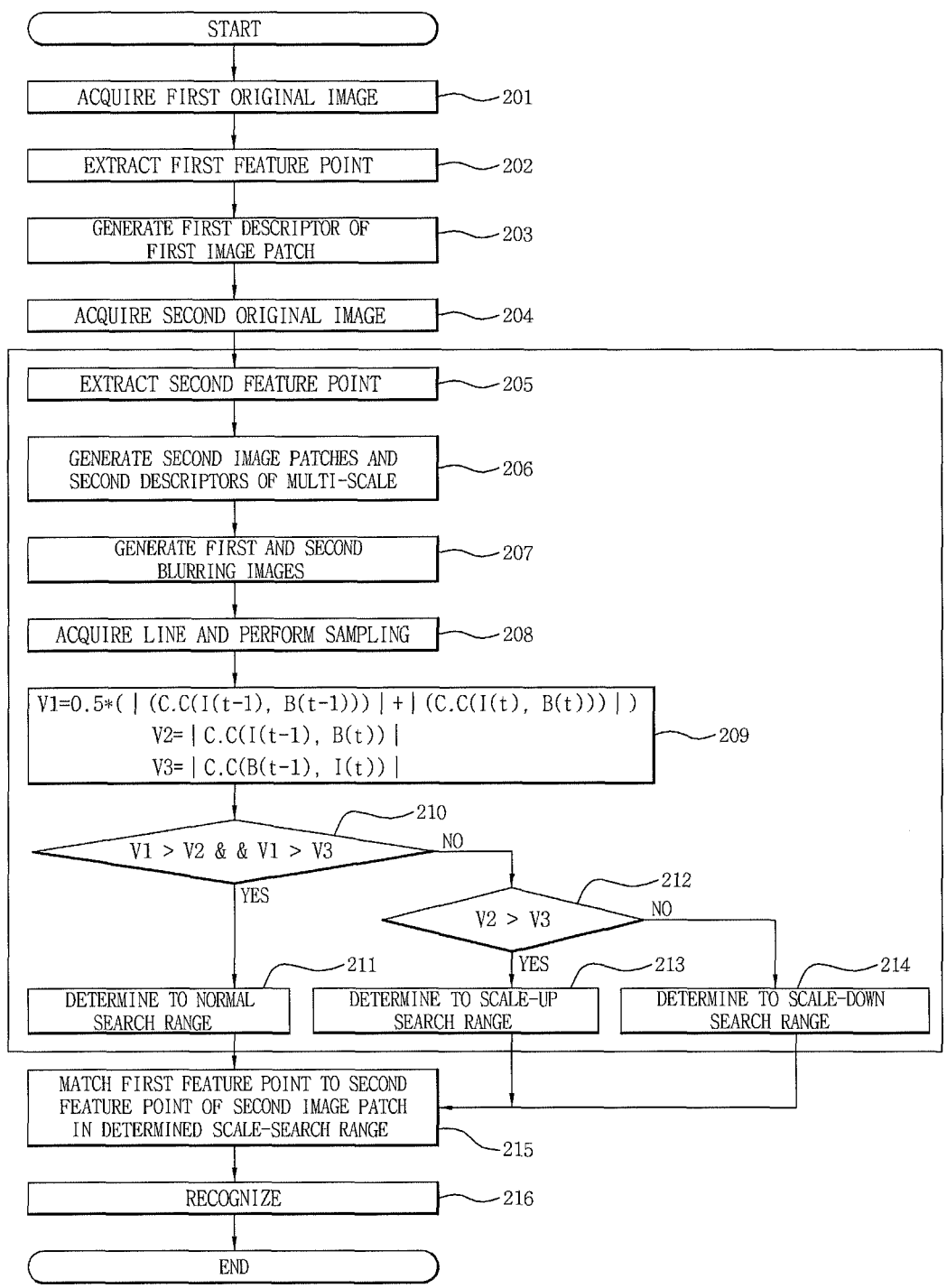
FIG. 3 is a flow chart of the operation of the mobile apparatus according to one or more embodiments.

FIG. 3 is a flowchart of the operation of the mobile apparatus according to one or more embodiments. Hereinafter, the operation of the mobile apparatus will be described with reference to FIG. 3 and FIGS. 4 to 9.

The mobile apparatus may acquire an image of a shape or an object in a space to perform object recognition or position recognition, and then may sequentially perform a feature point extraction and a matching by use of the acquired image.

Hereinafter, the operation of the mobile apparatus will be described in detail.

The mobile apparatus may acquire a first original image (201) and may extract a plurality of feature points from the acquired first original image.

Figure 4:
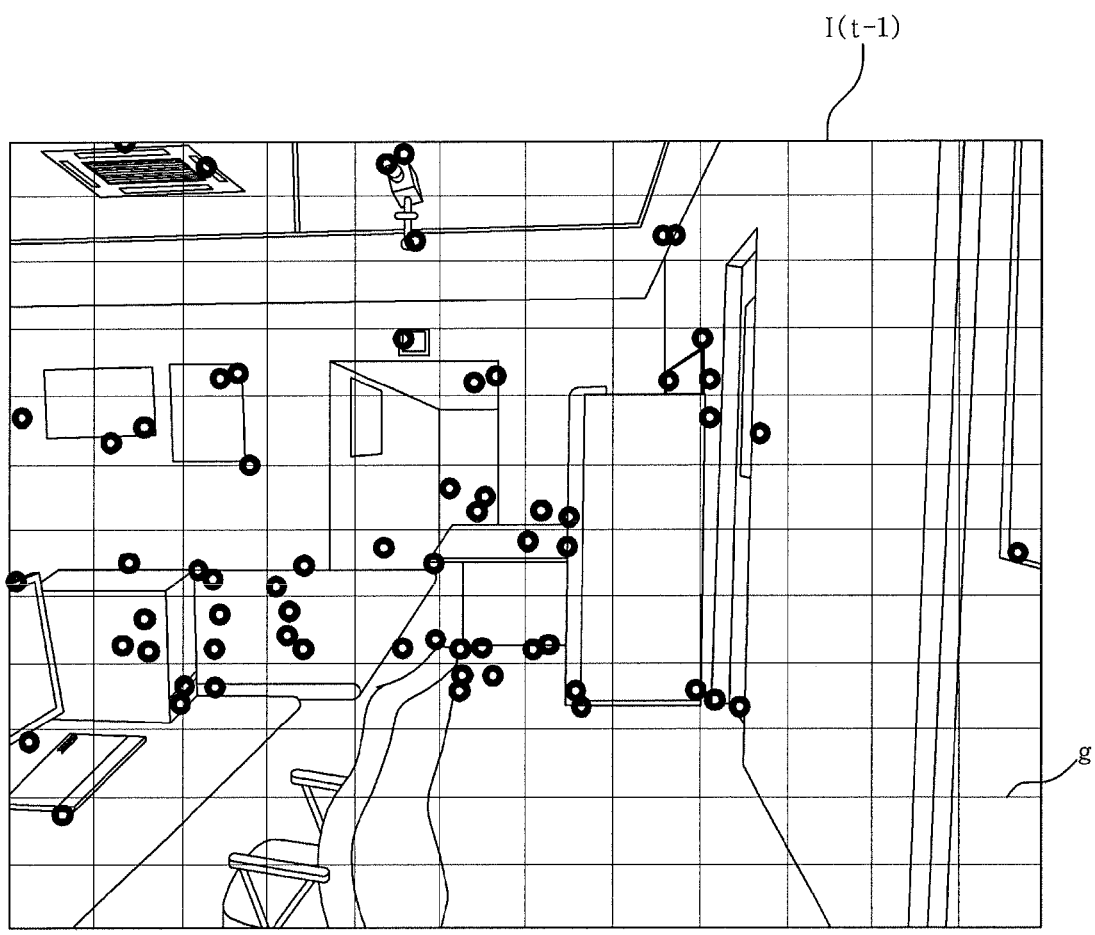
FIGS. 4 and 5 are views showing feature points extracted in the mobile apparatus according to one or more embodiments.

Referring to FIG. 4, in the extracting of the first feature point, the first original image may be divided into a predetermined size of grids (g) and the mobile apparatus may extract a predetermined number of first feature points from each grid (202). In this manner, the feature points may be equally extracted over the entire area of the first original image.

Then, the mobile apparatus may generate a first image patch corresponding to a first feature point region image having a first feature point as a center, and may generate a first descriptor for the first image patch (203). The generating of the first image patch and the first descriptor may be performed for each of the first feature points.

The mobile apparatus may generate first image patches of multi-scale and may generate a first descriptor for each of the first image patches of multi-scale.

In addition, the mobile apparatus may set the scale of a first image patch, which may be first generated from the first original image, as a first reference scale.

The mobile apparatus may acquire a second original image (204), and may extract a plurality of second feature points from the acquired second original image (205).

Figure 5:
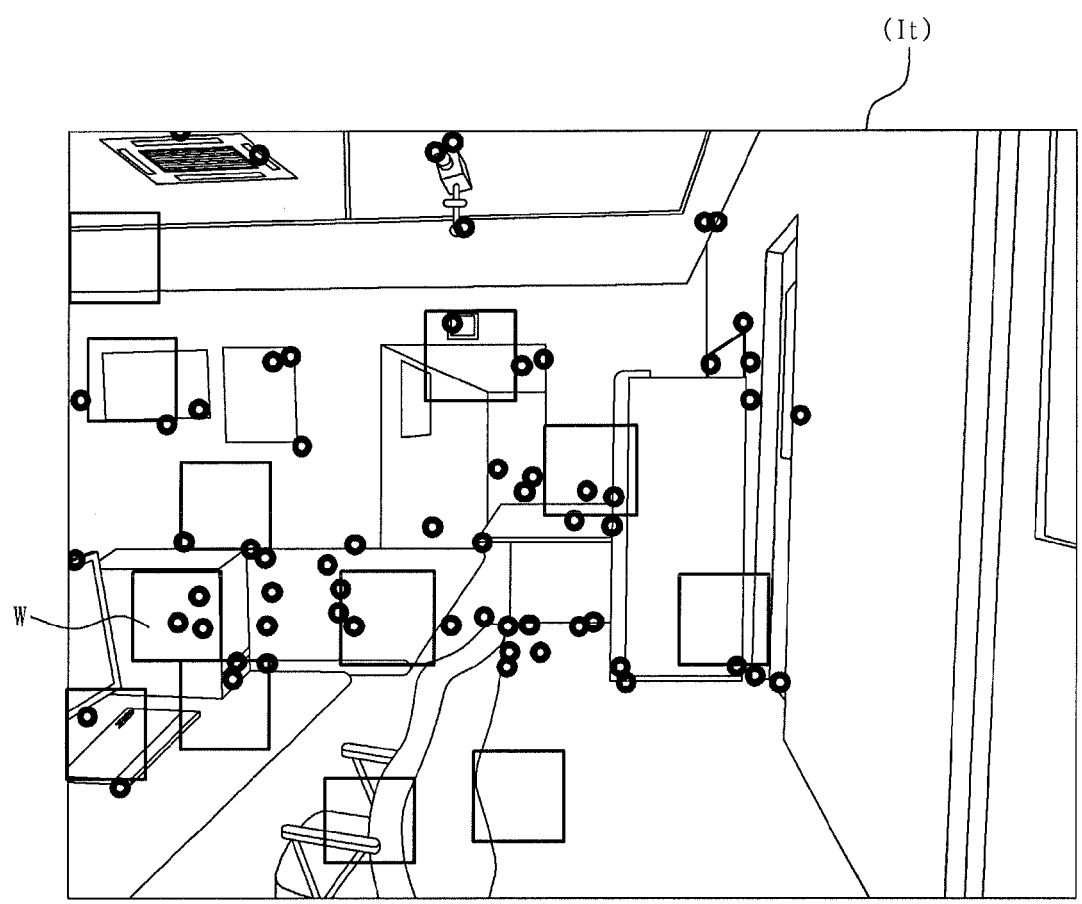

Referring to FIG. 5, in the extracting of the second feature points, a window (w) may be set on the second original image to correspond to each position of the first feature points, and the mobile apparatus may extract second feature points from each window.

The second feature points may be extracted from the second original image by FAST Corner Detector.

In addition, the second feature points may be extracted by use of a threshold value that may be smaller than that used in extracting the first feature points such that more second feature points may be extracted than first feature points.

Thereafter, the mobile apparatus may generate a second image patch corresponding to a second feature point region image having a second feature as a center. The scale of a second image patch, which may be first generated from the second original image, may be set as a second reference scale.

The mobile apparatus may gradually increase or decrease the second image patch having the second reference scale by a predetermined size.

Figure 6:
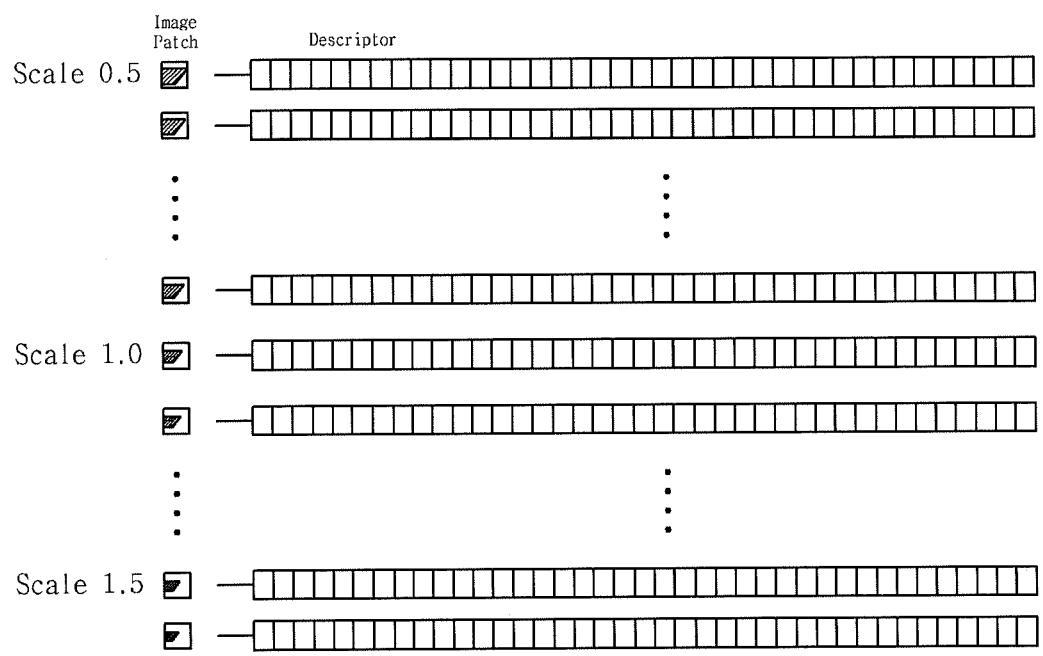
FIG. 6 is a view showing multi-scale image patches of the mobile apparatus according to one or more embodiments.

That is, referring to FIG. 6, second image patches of multi-scale may be generated, and a second descriptor for each of the second image patches may be generated (206).

The generating of the second image patch and the second descriptor may be performed for each of the second feature points.

The generating of the first and second descriptors may be achieved by Speeded Up Robust Features (SURF).

The SURF based descriptor generation is suggested by Herbert Bay, Andreas Ess, Tinne Tuytelaars, Luc Van Gool, "SURF: Speeded Up Robust Features", ECCV06.

Each of the first and second descriptors may have a feature vector. Hereinafter, the first and second descriptors will be described in detail.

The mobile apparatus may generate a descriptor by use of feature point information, including position information, size information, and direction information on adjacent pixels with respect to a candidate pixel having a threshold value or above.

That is, a block having a size of 16×16 may be set based on a candidate pixel and may measure directivity of each pixel in the block. The direction and the size of each pixel may be measured to estimate the most dominant direction in the block, and the estimated direction may be set as a direction of a corresponding feature point.

In order to obtain a final feature vector, a 16×16 block may be established for each feature point, and the 16×16 block may be formed into a 4×4 block in which the direction of pixel value changes may be measured. The direction of change may be set to be in proportional to the gradient of change, so that a probability distribution for direction may be obtained such that the larger the magnitude of change of a predetermined direction, the larger the probability distribution for the predetermined direction.

Figure 7:
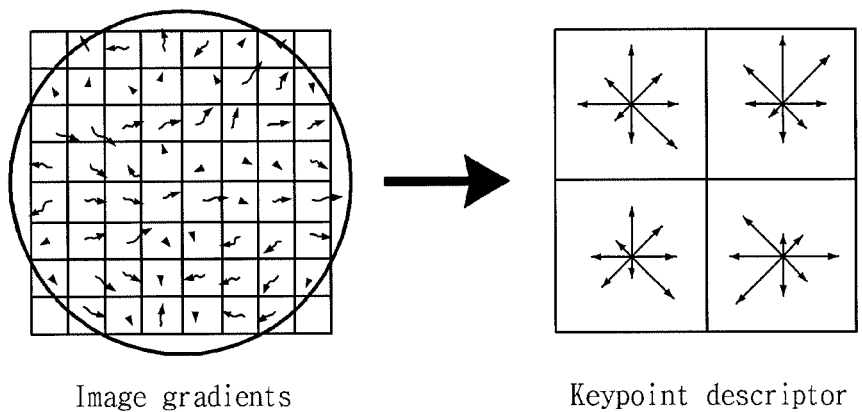
FIG. 7 is a view showing a descriptor of the mobile apparatus according to one or more embodiments.

Referring to FIG. 7, the distribution for direction may be extracted from a 8×8 block and then is quantized in eight directions.

The distribution for direction may be stored based on eight directions, and thus may be represented as a 128-dimensional vector for a 16×16 block. The vector representing the distribution for direction may be a feature vector.

The 128-dimensional feature vector may be subject to vector quantization and may be represented as a code book.

A feature vector which may be initially obtained may be a random real number having a floating point, and may require a great transmission capacity and time in transmitting feature vectors and comparing distance between feature vectors.

Accordingly, an eight-dimensional vector classified by eight directions may be subject to vector quantization, and the eight-dimensional direction distribution, which may be represented as a real number, may be mapped to a one dimensional code book.

Through this vector quantization, a 128 dimensional feature vector having a real number coefficient may be converted to a 16 dimensional vector having an integer coefficient.

When calculating feature vectors, which may be converted to a 16-dimensional vector through the above quantization, the 16-dimensional vector may be restored to a 128-dimensional vector of a code book.

Thereafter, the moving apparatus may generate a scale-search range based on the scale of a second image patch that may be first generated.

Figure 8:
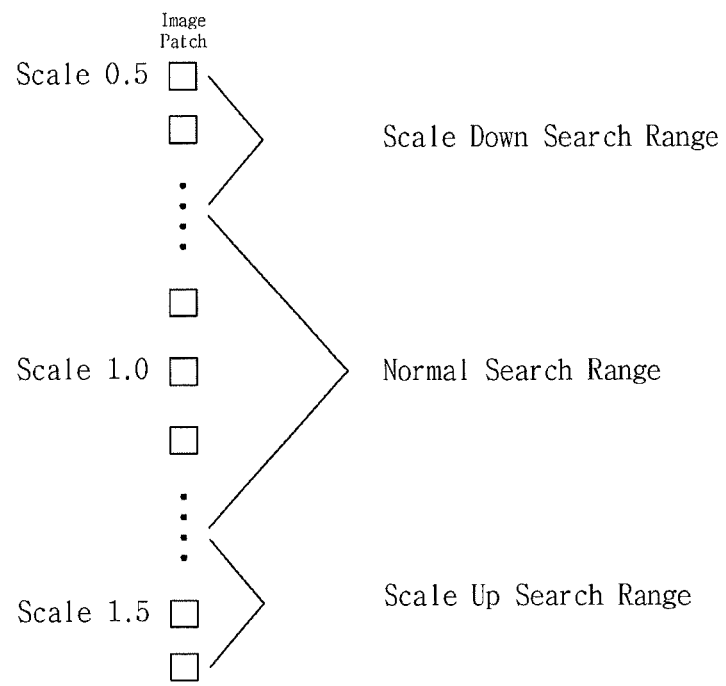
FIG. 8 is a view showing a scale-search range set in the mobile apparatus according to one or more embodiments.

Referring to FIG. 8, the moving apparatus may set a scale of a second image patch, which may be first generated, as a second reference scale (Scale 1.0), may generate second image patches of different scales by increasing or decreasing the second image patch, and may arrange the generated image patches according to scales.

Then, the moving apparatus may set a predetermined range based on the second reference scale (Scale 1.0) to a normal-search range, may set a range equal to or lower than the predetermined range to a scale down-search range, may set a range higher than the predetermined range to a scale up-search range, and may store the set ranges.

The mobile apparatus may predict the change of the second original image in scale to match feature points of the first original image to feature points of the second original image (207 to 214).

To this end, the mobile apparatus may generate a first blurring image B(t−1) and second blurring image B(t) by blurring the first original image and the second original image, respectively (207).

The mobile apparatus may generate at least one line on the first original image, the second original image, the first blurring image and the second blurring image, and may sample the at least one line (208). The at least one line may be a straight that horizontally extends in the middle of each image.

Correlation coefficients may be calculated from the lines each sampled from the images (209), a first similarity, a second similarity and a third similarity may be calculated based on the calculated correlation coefficients (209), the calculated similarities may be compared to each other (210 and 212) and the change of the second original image in scale may be predicted (211, 213 and 214).

According to the predicting of scale according to one or more embodiments, at least one line may be generated, and the generated line may be sampled to obtain a correlation coefficient, so that the time consumed to predict scale may be reduced.

Hereinafter, a method of predicting the change of the second original image in scale based on a similarity will be described in detail.

A change of subsequent images in scale may occur because the images may be acquired at a changing position, or an external impact may be applied when the images are acquired. The change of images in scales will be described with reference to FIGS. 9 to 13.

Figure 9:
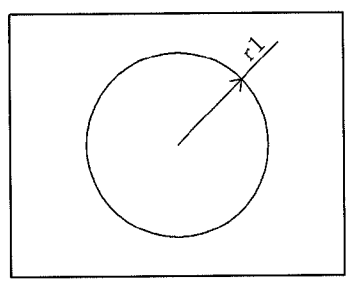
FIGS. 9 to 13 are views illustrating the change in scale of an image acquired by the mobile apparatus according to one or more embodiments.
Figure 9:
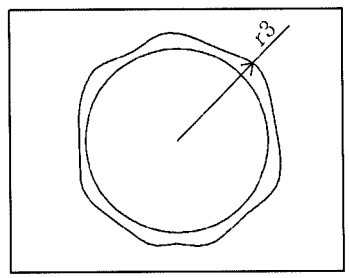
Figure 9:
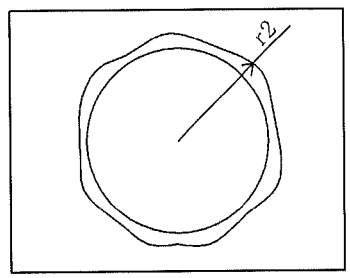
Figure 9:
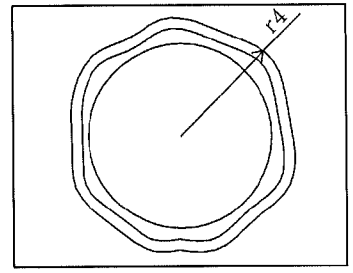

Referring to FIG. 9, if a first original image, which may be acquired in a normal state, is subject to external impact; and sequentially, if a second original image is acquired, a blurr may occur in the second original image. Accordingly, the second original image I(t) may be more similar to the first blurring image B(t−1), which is obtained by blurring the first original image, than to the first original image.

That is, a first original image having a radius of r1 may be blurred, so a radius of an object of the first original image may be increased to r2 corresponding to a radius of an object of a first blurring image; and a radius r2 of an object of a second blurring image may come to be similar to a radius r3 of an object of a second original image.

Figure 10:
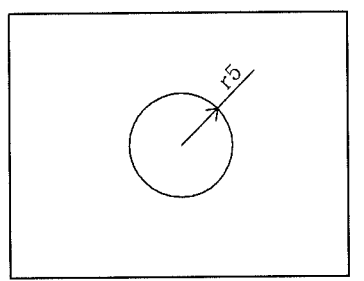
Figure 10:
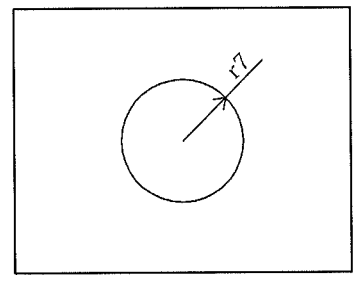
Figure 10:
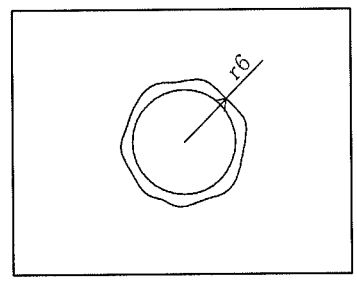
Figure 10:
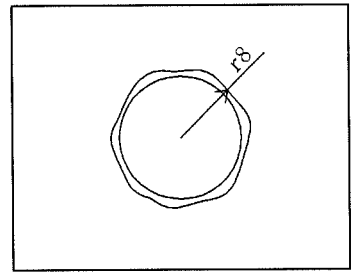

Referring to FIG. 10, if a first original image I(t−1) is acquired and sequentially a second original image I(t) is obtained at a position closer to an object than the position at which the first original image I(t−1) is acquired, the second original image I(t) may be similar to a first blurring image B(t−1) that may be obtained by blurring the first original image I(t−1).

That is, the radius r6 of an object of the first blurring image B(t−1) may be similar to the radius r7 of an object of the second original image I(t).

Figure 11:
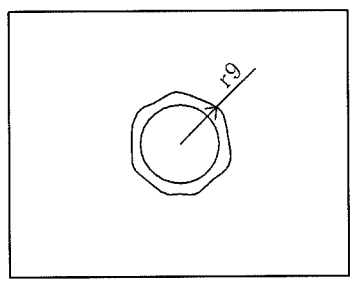
Figure 11:
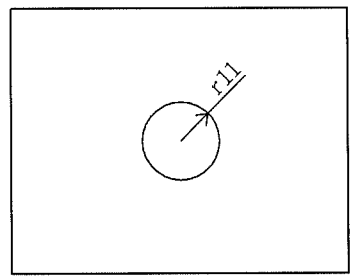
Figure 11:
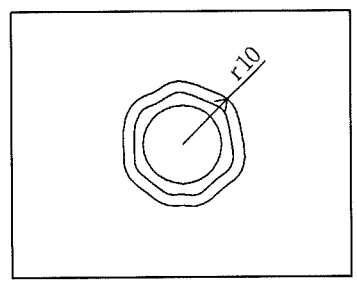
Figure 11:
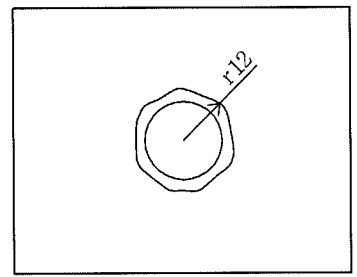

Referring to FIG. 11, if a first original image I(t−1) is acquired while having an impact applied thereto and sequentially a second original image I(t) is acquired without having an impact applied thereto, a second blurring image B(t) for a second original image may be similar to the first original image I(t−1).

That is, the radius r12 of an object of the second blurring image B(t) may be similar to the radius r9 of an object of the first original image I(t−1).

Figure 12:
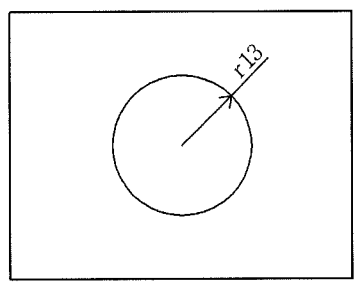
Figure 12:
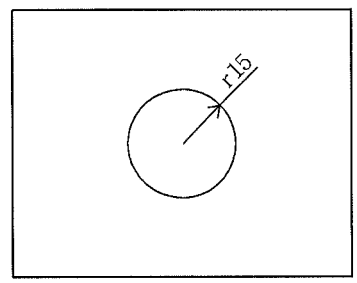
Figure 12:
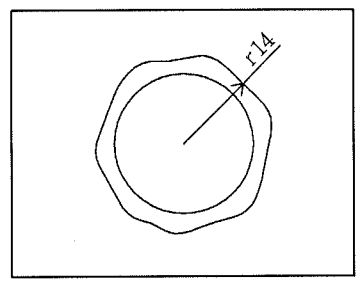
Figure 12:
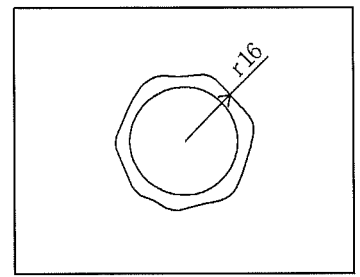

Referring to FIG. 12, if a first original image I(t−1) is acquired and sequentially a second original image I(t) is obtained at a position further away from an object than the position at which the first original image I(t−1) is acquired, a second blurring image B(t) for the second original image I(t) may be similar to the first original image I(t−1).

That is, the radius r16 of an object of the second blurring image B(t) may be similar to the radius r13 of an object of the first original image I(t−1).

That is, if a blur occurs in an object of an image when blurring is performed through an algorithm or a camera is shaken by external impact, the size of an object in an image having blurred therein may be larger than that of an object obtained in a normal state.

In addition, as a position of a camera corresponding to an image acquiring position is getting closer to an object, the object may be represented to be larger in an image. As the position of the camera is getting distant from an object, the object may be represented to be smaller in an image.

Figure 13:
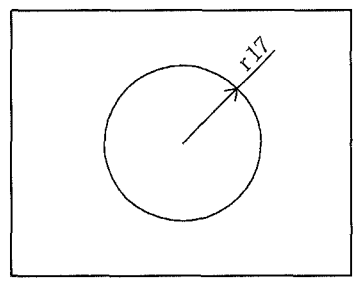
Figure 13:
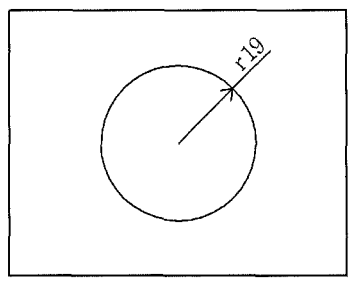
Figure 13:
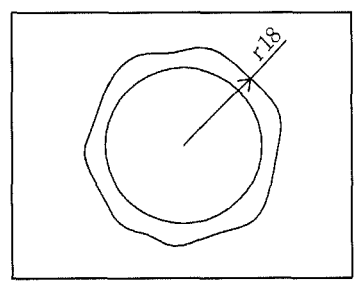
Figure 13:
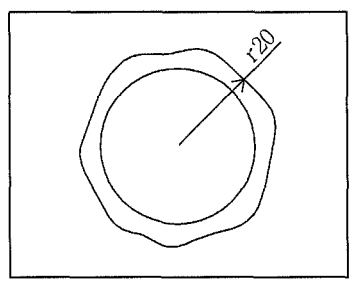

Meanwhile, referring to FIG. 13, if a first original image I(t−1) is acquired and sequentially a second original image I(t) is acquired without changing the image acquiring position and without having an impact applied to the camera, the difference between a second blurring image B(t) and the second original image I(t) may be equal to or similar to a difference between a first blurring image B(t−1) and the first original image I(t−1).

If the second original image does not change in scale, the radius r17 of an object of the first original image may be similar to the radius r19 of an object of the second original image, and the radius r18 of an object of the first blurring image obtained by blurring the first original image may be similar to the radius r20 of an object of the second blurring image obtained by blurring the second original image.

Referring to FIGS. 9 to 13, the similarity between the first original image and the second blurring image, and the similarity between the second original image and the first blurring image may be high.

In this manner, the change of the second original image in scale may be predicted.

The mobile apparatus calculates a first similarity V1 based on correlation coefficients among a first original image I(t−1), a second original image I(t), a first blurring image B(t−1) and a second blurring image B(t).

The first similarity V1 may represent the average of the sum of a correlation coefficient between the first original image I(t−1) and the first blurring image B(t−1) and a correlation coefficient between the second original image I(t) and the second blurring image B(t). A larger first similarity V1 may represent a small change of an image.

A second similarity V2 may be calculated based on a correlation coefficient between the first original image I(t−1) and the second blurring image B(t), and a third similarity V3 may be calculated based on a correlation coefficient between the first blurring image B(t−1) and the second original image I(t).

The correlation coefficient may be implemented using a cross-correlation coefficient.

A larger second similarity V2 may represent that the first original image is blurred or the image acquiring position is getting distant away from an object. A larger third similarity V3 may represent that the second original image is blurred or the image acquiring position is getting closer to an object.

The relationship between the correlation coefficient and the change in scale may be as follows.

$$V1=0.5*(|(C.C(I(t-1),B(t-1)))|+|(C.C(I(t),B(t)))|)$$

$$V2=|(C.C(I(t-1),B(t)))|$$

$$V3=|(C.C(B(t-1),I(t)))|$$

Herein, C.C. represents a cross correlation coefficient and abs represents the absolute value.

The mobile apparatus may compare a similarity based on the correlation coefficient between the first original image and the first blurring image with a similarity based on the correlation coefficient between the second original image and the second blurring image. If the difference between the similarities exceeds a predetermined value, it may be determined that the second original image is changed in scale. Accordingly, a value of scale change of the second original image may be predicted.

If the difference between the similarities is below a predetermined value, it may be determined that the second original image maintains its scale. Accordingly, a second feature point of the second original image at the present time may be matched to a first feature point of the first original image.

The mobile apparatus may compare the first, second, and third similarities among one another (210). If the first similarity is largest among the first similarity, the second similarity and the third similarity, a scale-search range may be set to a normal search range (211).

If the first similarity is equal to or smaller than at least one of the second similarity and the third similarity, the mobile apparatus may compare the second similarity with the third similarity (212). If the second similarity is larger than the third similarity, a scale-search range may be set to a scale-up search range (213). If the second similarity is equal to or smaller than the third similarity, a scale-search range may be set to a scale-down search range (214).

In addition, the mobile apparatus may compare a feature vector of a first descriptor having a first reference scale, which may be associated with a predetermined first feature point, with feature vectors of second descriptors of second image patches for each scale included in the predicted scale range. Then, the mobile apparatus may predict a scale, including a second descriptor, which may have a feature vector that is nearest to the feature vector of the first descriptor among the second descriptors, as the scale of the second image patch.

Then, the mobile apparatus may search for a first descriptor of a first image which is the most identical to a second descriptor of a second image patch in the predicted scale-search range, and may match a first feature point having the found first descriptor to a second feature point having the corresponding second descriptor in the second image patch (215). The mobile apparatus may perform at least one of object recognition, and position recognition on an object based on the matching result (216), and may control the operation of the mobile apparatus.

The object recognition and the position recognition may be achieved based on distribution information of matched feature points. The distribution information of matched feature points may include, for example, information on the number of feature points that are matched during the recognition, the position of a matched feature, the length of a segment connecting between the matched feature points and the gradient of the segment.

Hereinafter, the matching process will be described in more detail.

The mobile apparatus may match a first descriptor for a first image patch of a first reference scale to a second descriptor for a second image patch in a predicted scale-search range. The first image patch of the first reference scale may represent a first image patch that is first generated based on the first original image.

In addition, if a plurality of second image patches of different scales exists in the predicted scale-search range, a first image patch may be matched to each of the plurality of second image patches.

For example, a plurality of first feature points may include a 1-1 feature point, a 1-2 feature point and a 1-3 feature point, and a plurality of second feature points may include a 2-1 feature point, a 2-2 feature point and a 2-3 feature point. A 1-1 image patch may have the 1-1 feature point, a 1-2 image patch may have the 1-2 feature point and a 1-3 image patch may have the 1-3 feature point. A 2-1 image patch may have the 2-1 feature point, a 2-2 image patch may have the 2-2 feature point and a 2-3 image patch may have the 2-3 feature point. A 1-1 descriptor may be provided for the 1-1 image patch, a 1-2 descriptor may be provided for the 1-2 image patch and a 1-3 descriptor may be provided for the 1-3 image patch. A 2-1 descriptor may be provided for the 2-1 image patch, a 2-2 descriptor may be provided for the 2-2 image patch, and a 2-3 descriptor may be provided for the 2-3 image patch.

It may be assumed that the scale-search range of the second image patch is a normal search range (Scales 0.9, 1.0 and 1.1).

The mobile apparatus may calculate each distance of the feature vector of the 1-1 descriptor, the feature vector of the 1-2 descriptor, and the feature vector of the 1-3 descriptor with respect to the feature vector of the 2-1 descriptor at respective scales 0.9, 1, 0, and 1.1. The mobile apparatus may search for a descriptor (for example, the 1-1 descriptor) having a feature vector that is the nearest to the feature vector of 2-1 descriptor, and then may match the found 1-1 descriptor to the 2-1 descriptor.

The mobile apparatus may calculate each distance of the feature vector of the 1-1 descriptor, the feature vector of the 1-2 descriptor, and the feature vector of the 1-3 descriptor with respect to the feature vector of the 2-2 descriptor at respective scales 0.9, 1, 0 and 1.1. The mobile apparatus may search for a descriptor (for example, the 1-2 descriptor) having a feature vector that is the nearest to the feature vector of 2-2 descriptor, and then may match the found 1-2 descriptor to the 2-2 descriptor.

The mobile apparatus may calculate each distance of the feature vector of the 1-1 descriptor, the feature vector of the 1-2 descriptor, and the feature vector of the 1-3 descriptor with respect to the feature vector of the 2-3 descriptor at respective scales 0.9, 1, 0 and 1.1. The mobile apparatus may search for a descriptor (for example, the 1-3 descriptor) having a feature vector that is the nearest to the feature vector of 2-3 descriptor, and then may match the found 1-3 descriptor to the 2-3 descriptor.

That is, the mobile apparatus may match a 2-1 feature point of a 2-1 image patch having the 2-1 descriptor to a 1-1 feature point of a 1-1 image patch having the 1-1 descriptor; match a 2-2 feature point of a 2-2 image patch having the 2-2 descriptor to a 1-2 feature point of a 1-2 image patch having the 1-2 descriptor; and match a 2-3 feature point of a 2-3 image patch having the 2-3 descriptor to a 1-3 feature point of a 1-3 image patch having the 1-3 descriptor.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A method of controlling a mobile apparatus, the method comprising:
   acquiring a first original image and then a second original image;
   extracting a plurality of first feature points of the first original image and a plurality of second feature points of the second original image;
   generating a first blurring image and a second blurring image by blurring the first original image and the second original image, respectively,
   calculating a similarity between at least two images of the first original image, the second original image, the first blurring image, and the second blurring image;
   determining a change in scale of the second original image based on the calculated similarity; and
   controlling at least one of an object recognition and a position recognition by matching a second feature point of the plurality of second feature points to a first feature point of the plurality of first feature points based on the change in scale,
   wherein the calculating the similarity of the at least two images among the first original image, the second original image, the first blurring image, and the second blurring image includes,
      calculating a first similarity corresponding to a correlation coefficient among the first original image, the first blurring image, the second original image, and the second blurring image;
      calculating a second similarity corresponding to a correlation coefficient between the first original image and the second blurring image; and
      calculating a third similarity corresponding to a correlation coefficient between the first blurring image and the second original image.

2. The method of claim 1, wherein the extracting of the first feature point from the first original image comprises:
   dividing the first original image into grids having a predetermined size; and
   extracting a predetermined number of first feature points from each grid.

3. The method of claim 1, wherein the extracting of the first feature point from the first original image is performed by use of a Features from Accelerated Segment Test (FAST) corner detector with a first threshold value.

4. The method of claim 3, wherein the extracting the plurality of second feature points from the second original image comprises extracting a larger number of second feature points than a number of first feature points by use of a FAST corner detector with a second threshold value, the second threshold value being smaller than the first threshold value.

5. The method of claim 1, further comprising:
   predicting a scale of the second original image, the predicting including,
      generating a first image patch having the first feature point, and a plurality of second image patches of multi-scale each having the second feature point;
      predicting the scale of the second image patch in a normal search range when the first similarity is largest among the first similarity, the second similarity, and the third similarity;
      comparing the second similarity with the third similarity when the first similarity is equal to or smaller than at least one of the second similarity and the third similarity;
      predicting the scale of the second image patch in a scale-up search range when the second similarity is larger than the third similarity; and
      predicting the scale of the second image patch in a scale-down search range when the second similarity is equal to or smaller than the third similarity.

6. The method of claim 5, wherein the matching of the first feature point to the second feature point comprises:
generating a first descriptor corresponding to the first image patch and a plurality of second descriptors of multi-scale corresponding to the plurality of second image patches; and
matching the first descriptor of the first image patch to a second descriptor among the plurality of second descriptors corresponding to a second image patch in the predicted scale-search range.

7. The method of claim 6, wherein the generating of the first descriptor and the second descriptor is performed by use of Speeded Up Robust Feature (SURF).

8. The method of claim 6, wherein the predicting of the scale the second image patch based on the calculated similarity comprises:
comparing a feature vector of each of the plurality of second descriptors of the second image patch in the predicted scale-search range with a feature vector of the first descriptor of the first image patch to calculate a distance between the feature vectors;
checking a second descriptor having a feature vector that is nearest to the feature vector of the first descriptor among the among the plurality of second descriptors; and
predicting a scale having the checked second descriptor as the scale of the second image patch.

9. The method of claim 6, wherein the generating of the first image patch having the first feature point of the first original image, and the second image patch having the second feature point of the second original image comprises:
extracting a plurality of first feature points and a plurality of second feature points;
generating a plurality of first image patches, each corresponding to each of the first feature points, and a plurality of second image patches, each corresponding to each of the second feature points; and
generating a plurality of first descriptors each corresponding to each of the first image patches and a plurality of second descriptors each corresponding to each of the second image patches,
wherein the matching of the first descriptor of the first image patch to the second descriptor of the second image patch in the predicted scale-search range includes,
comparing feature vectors of each of the plurality of first descriptors with feature vectors of a plurality of second descriptors in the predicted scale range; and
matching a first feature point to a second feature point of a second descriptor in the predicted scale, in which a first descriptor of the matched first feature point has a feature vector nearest to a feature vector of the second descriptor of the matched second feature point.

10. The method of claim 5, further comprising:
setting a scale of a second image patch that is first generated among the second image patches as a reference scale;
generating a plurality of second image patches each having a different scale that is increased or decreased based on the reference scale;
arranging the plurality of second image patches according to scales;
setting a predetermined range based on the reference scale to a normal-search range;
setting a range equal to or lower than the predetermined range to a scale down-search range; and
setting a range higher than the predetermined range to a scale up-search range and storing the ranges.

11. The method of claim 1, wherein the calculating of the first similarity, the second similarity and the third similarity comprises:
generating at least one line on the first original image, the second original image, the first blurring image, and the second blurring image;
calculating a correlation coefficient between at least two images among the first original image, the second original image, the first blurring image, and the second blurring image by sampling the at least one line; and
calculating the first similarity, the second similarity, and the third similarity based on the calculated correlation coefficient between the at least two images.

12. The method of claim 1, wherein the extracting of the second feature point from the second original image comprises:
setting a window of a predetermined range that is generated based on a position of the first feature point; and
extracting a second feature point in the set window.

13. A mobile apparatus comprising:
at least one processor which provides:
an image acquirer configured to acquire a first original image and a second original image of an object;
a feature point extractor configured to extract a first feature point of the first original image, to extract a second feature point of the second original image, and to generate a first image patch having the first feature point and a plurality of second image patches of multi-scale having the second feature point;
a blurring image generator configured to generate a first blurring image, which is obtained by blurring the first original image, and a second blurring image, which is obtained by blurring the second original image;
a scale predictor configured to predict a scale of the second image patch by calculating a similarity between at least two images of the first original image, the second original image, the first blurring image, and the second blurring image;
a matcher configured to match a second feature point included in a second image patch among the plurality of second image patches in the predicted scale to the first feature point included in the first image patch; and
a recognizer configured to perform at least one of an object recognition, and a position recognition based on the matching,
wherein the scale predictor is configured to calculate a first similarity corresponding to a correlation coefficient between the first original image, the first blurring image, the second original image, and the second blurring image, calculate a second similarity corresponding to a correlation coefficient between the first original image and the second blurring image, and to calculate a third similarity corresponding to a correlation coefficient between the first blurring image and the second original image.

14. The mobile apparatus of claim 13, wherein the at least one processor further provides a descriptor generator configured to generate a first descriptor for the first image patch and a plurality of second descriptors of multi-scale corresponding to the plurality of second image patches.

15. The mobile apparatus of claim 14, wherein the descriptor generator generates descriptors of at least one scale by use of Speeded Up Robust Feature (SURF).

16. The mobile apparatus of claim 13, wherein the feature point extractor generates grids of a predetermined size from the first original image and extracts a predetermined number of first feature points from each grid.

17. The mobile apparatus of claim 13, wherein the scale predictor generates at least one line on an identical position in the first original image, the second original image, the first blurring image, and the second blurring image, samples the at least one line, and calculates a correlated coefficient from the sampled at least one line.

18. The mobile apparatus of claim 13, wherein the feature point extractor extracts the first and second feature points by use of Features from Accelerated Segment Test (FAST) corner detector.

19. The mobile apparatus of claim 13, wherein the scale predictor is configured to set, as a reference scale, a scale of a second image patch that is first generated based on the second original image among the second image patches of multi-scale, to predict a scale of a second image patch in a predetermined range based on the reference scale if the first similarity is largest among the first similarity, the second similarity and the third similarity, to predict the scale of the second image patch in a range equal to or higher than the predetermined range if the first similarity is equal to or smaller than at least one of the second similarity and the second similarity is larger than the third similarity, and to predict the scale of the second image patch in a range lower than the predetermined range if the first similarity is equal to or smaller than at least one of the second similarity and the third similarity and the second similarity is equal to or smaller than the third similarity.

20. A method of controlling a mobile apparatus, the method comprising:
    acquiring a first original image and then a second original image;
    extracting a plurality of first feature points of the first original image and a plurality of second feature points of the second original image, a number of second feature points among the plurality of second feature points being greater than a number of first feature points among the plurality of first feature points;
    generating a first blurring image and a second blurring image by blurring the first original image and the second original image, respectively,
    calculating a similarity between at least two images of the first original image, the second original image, the first blurring image, and the second blurring image;
    determining a change in scale of the second original image based on the calculated similarity; and
    controlling at least one of an object recognition and a position recognition by matching a second feature point of the plurality of second feature points to a first feature point of the plurality of first feature points based on the change in scale,
    wherein the calculating the similarity between the at least two images of the first original image, the second original image, the first blurring image, and the second blurring image includes,
        calculating a first similarity corresponding to a correlation coefficient among the first original image, the first blurring image, the second original image, and the second blurring image;
        calculating a second similarity corresponding to a correlation coefficient between the first original image and the second blurring image; and
        calculating a third similarity corresponding to a correlation coefficient between the first blurring image and the second original image.

21. The method of claim 20, wherein the extracting of the first feature point from the first original image is performed by use of a Features from Accelerated Segment Test (FAST) corner detector with a first threshold value and the extracting the plurality of second feature points from the second original image comprises extracting a larger number of second feature points than a number of first feature points by use of a FAST corner detector with a second threshold value, the second threshold value being smaller than the first threshold value.

* * * * *